Feb. 24, 1931.  F. O. SNOW, JR  1,794,332

TRACTOR

Filed May 9, 1927

Inventor:
Frederick O. Snow Jr.
By Emery, Booth, Janney & Varney
Attys.

Patented Feb. 24, 1931

1,794,332

UNITED STATES PATENT OFFICE

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE

TRACTOR

Application filed May 9, 1927. Serial No. 189,778.

My invention aims to provide an improved tractor and in the accompanying drawings is shown an illustrative embodiment of the invention, wherein.

Figure 1:
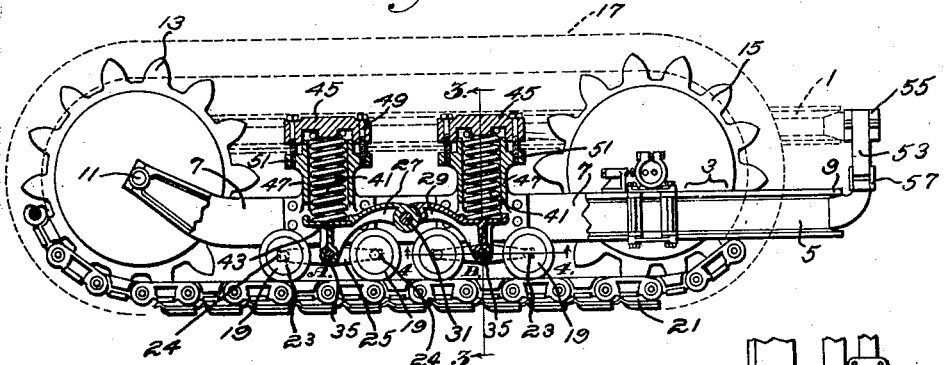
Fig. 1 is a part section and part side elevation of the tractor.
Figure 2:
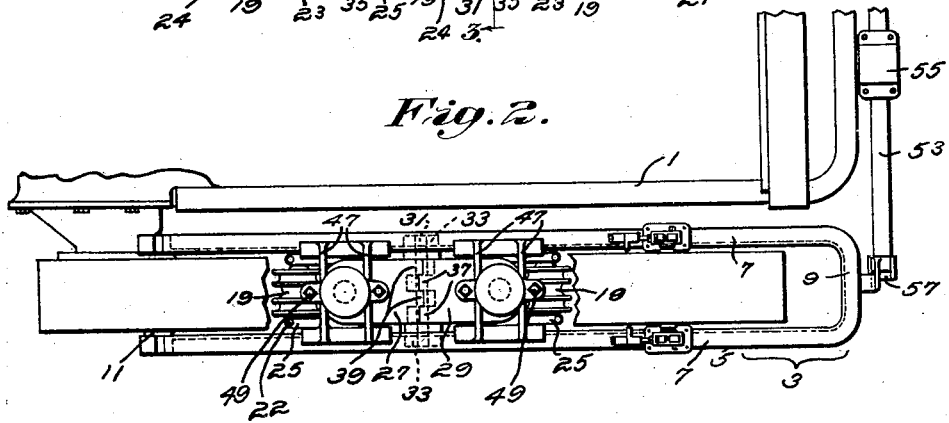
Fig. 2 is a partial plan view of the same portions of the track being broken away the more clearly to show the trucks.
Figure 3:
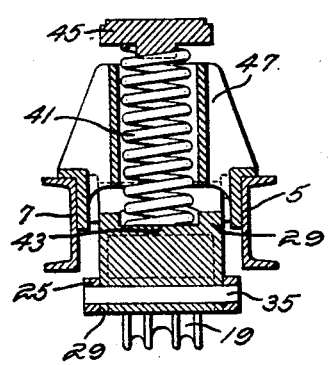
Fig. 3 is a detail section taken on the line 3—3 of Fig. 1.
Figure 4:
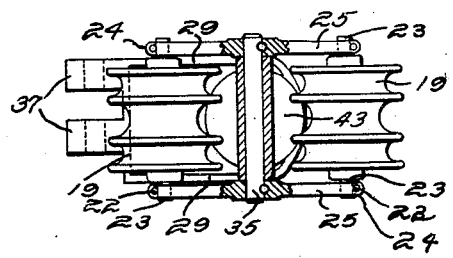
Fig. 4 is a detail horizontal section on the line 4—4 of Fig. 1, looking up.

In the particular embodiment of my invention selected for purposes of illustration and shown in the drawings, a frame 1, herein representing the main structure of the tractor, is supported by pivoted track structures 3 arranged upon opposite sides of the main frame 1, but inasmuch as these track structures are similar in construction only one is shown in the present drawings and described in the specification.

The track structure 3 includes a traction frame 5 composed of spaced side members 7 and an end member 9 uniting said side members at one end, preferably the forward end of the tractor. The rear ends of the side members 7 are pivotally mounted upon an axel 11 extending laterally from and supported upon the main frame 1.

Arranged between the side members 7 of said traction frame are sprocket wheels 13 and 15, the sprocket wheel 13 being journaled upon the axle 11 and driven in any appropriate manner not herein shown. The sprocket 15 is pivotally mounted upon the members 7 near the forward ends thereof and is adjustable in any appropriate manner longitudinally of the traction frame 5 toward and away from the sprocket 13 for the purpose of maintaining the proper tension upon a flexible endless track 17 supported upon said sprocket wheels.

A plurality of track rollers 19 are arranged between the sprockets 13 and 15 to rest upon the lower run 21 of said track chain for the usual purpose of supporting a part at least of the load of the tractor and for causing the track to conform to irregularities in the surface of the ground over which the tractor is moving.

In the present example two pairs of track rollers are shown in each track and the rollers for each pair are journaled to rotate upon shafts 23 secured by screws 22 in the split opposite ends 24 of equalizing parallel armed rocker frames 25, which together with said rollers form trucks A and B.

The trucks A and B are herein independently mounted for vertical swinging movements and are maintained in proper relation longitudinally of the track frames 5 by radius arms 27 and 29, both of which are desirably pivotally mounted upon a common transverse shaft 31 mounted in bearings 33 carried by the side members 7 of said traction frame 5.

The arm 27 extends from the shaft 31 rearwardly into engagement with the truck A. Desirably this engagement is also pivotal, the free end of said arm being pivoted at 28 upon a shaft 35 extending transversely of the rocker frame 25 substantially midway between the shafts 23 thereof.

The radius arm 29, also pivoted upon the transverse shaft 31, is provided with spaced bearing lugs 37 alternating with similar bearing lugs 39 of the arm 27 and said arm 29 extends forwardly from said shaft 31 into similar pivotal relation with the shaft 35 of the rocker frame 25 of the forward truck B.

Interposed between the trucks A and B and the frame, herein the traction frame 5, are resilient supporting members or springs 41, the lower ends of which springs desirably rest in spring seats 43 formed near the free ends of said radius arms, while the upper end of said springs seat in adjustable seats 45 carried by yokes 47, supported between the side member 7 of said traction frames. The adjustable seats 45 are adjustably connected, for example by screws 49 with lugs 51 projecting laterally from the yokes 47, thus permitting adjustment of the tension of said springs.

The forward ends of the traction frames 5 may be connected in any appropriate manner to the main frame, but for convenience I have shown for this purpose a transverse resilient equalizing member or spring 53 pivotally connected centrally with a pivotal shaft 55 supported centrally of the main frame 1 and at opposite ends connected by shackles 57 with the cross members 9 of said traction frames 5.

By reason of the aforesaid construction the traction frames will be capable of yielding swinging movements in vertical planes relatively to the main frame and the trucks A and B will be capable of independent vertical swinging movement relatively to said traction frames, the vertical movements of said trucks being transmitted through the springs 41 first to the traction frames, and the movements of the traction frames, being equalized by the equalizer spring 53, will transmit a greatly reduced movement to the main frame of the tractor.

The spaced bearings of the radius arms 27 and 29 will provide ample rigidity and support against lateral displacement of the trucks relatively to the traction frames, yet they will be substantially free for vertical movements except for such limitations as may be imposed by the springs 41 and the track chains 17.

The invention is not limited to the particular embodiment shown but should be interpreted as broadly as the terms of said claims will allow.

Claims:

1. A tractor having traction means including a frame, independently oscillatable trucks each having a plurality of rollers, an equalizing member connecting together the rollers of each truck, a radius arm oscillatably connecting each of said equalizing members with a common pivot on said frame, a spring seat carried by each of said radius arms, a spring seat supported in substantial alignment upon said frame respectively with the seats upon said radius arms and a helical spring interposed between each frame seat and its cooperating radius arm seat resiliently to distribute the load of said tractor upon a plurality of said rollers.

2. A tractor having traction means including a frame, independently movable trucks each having a plurality of rollers, an equalizing member pivotally connecting together the rollers of each truck, a radius arm oscillatably connecting each equalizing member with said frame, a spring seat associated with each of said radius arms, a spring seat adjustably connected with said frame in operative relation to the spring seat of its cooperating radius arm and helical springs interposed between said cooperating spring seats whereby the load from said frame will be resiliently distributed upon a plurality of truck rollers and independent relative movements of said trucks be permitted.

In testimony whereof, I have signed my name to this specification.

FREDERICK O. SNOW, Jr.